July 15, 1941.  W. TURK  2,249,096
APPARATUS FOR MEASURING THE DISCHARGE OF STREAMS
Filed May 3, 1938  2 Sheets-Sheet 1
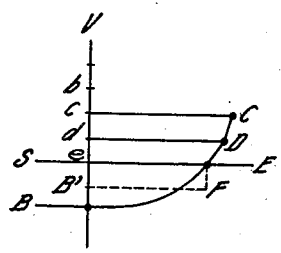
Fig. 1
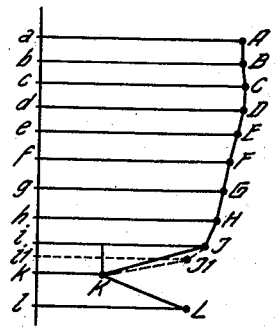
Fig. 5
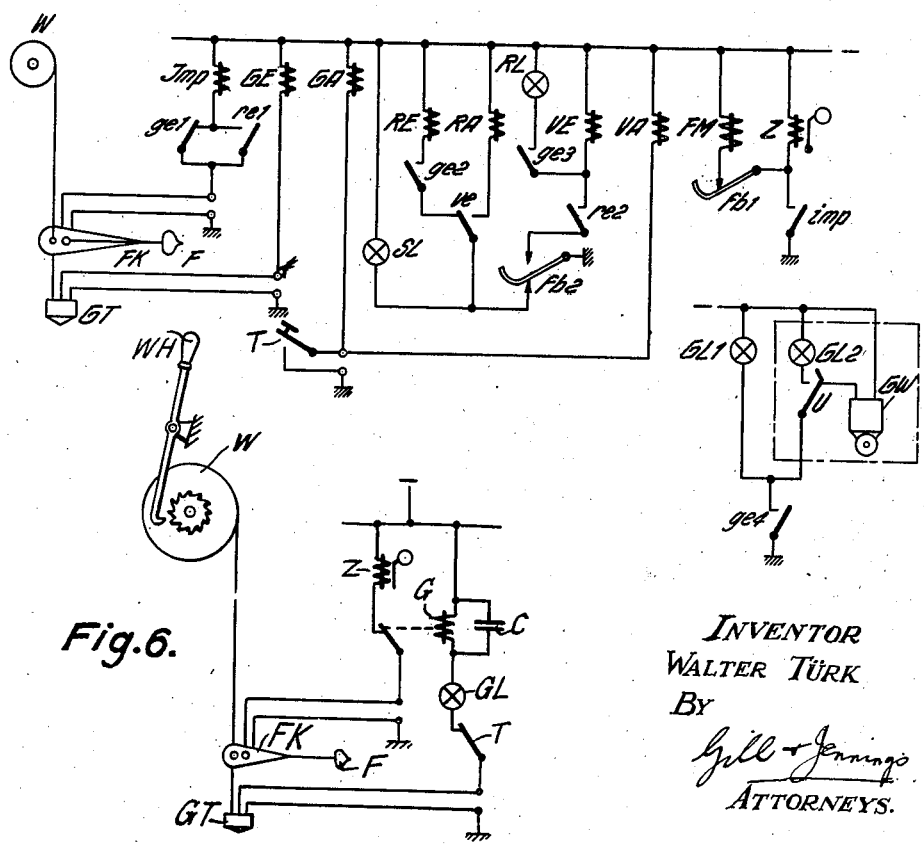
Fig. 2
Fig. 6.
INVENTOR
WALTER TÜRK
BY
Gill + Jennings
ATTORNEYS.

July 15, 1941.  W. TURK  2,249,096

APPARATUS FOR MEASURING THE DISCHARGE OF STREAMS

Filed May 3, 1938  2 Sheets-Sheet 2

INVENTOR
Walter Turk
BY
ATTORNEYS

Patented July 15, 1941

2,249,096

UNITED STATES PATENT OFFICE 2,249,096

APPARATUS FOR MEASURING THE DISCHARGE OF STREAMS

Walter Turk, Karlsruhe, Germany, assignor to Telefonbau und Normalzeit G. m. b. H., Frankfort-on-the-Main, Germany, a corporation of Germany Application May 3, 1938, Serial No. 205,689
In Germany March 20, 1936

10 Claims. (Cl. 73—185)

This invention relates to the measurement of the velocity of flow and the discharge of streams.

One of the objects of the invention is to provide a device having means for measuring not only the velocity of flow at different points between the surface of the water and the bed of the stream but also near the bed of the stream.

Another object of the invention is to provide a device allowing the measurement of the mean velocity of flow of a stream.

Another object of the invention is to provide a device allowing the measurement of the total discharge of a stream.

Another object of the invention is to provide a counter counting the number of revolutions of a hydrometric current meter during lowering movements of said meter along different verticals equidistantly spaced across the stream.

With these and other objects in view, this invention consists in certain novel details of construction, combination and arrangement of parts to be more particularly hereinafter set forth and claimed.

The discharge of a stream is the product of the cross-sectional area of the stream and the mean velocity of flow. The velocity of flow is usually measured at various points in the cross-section under consideration by means of a hydrometric current meter, the rotating member of which controls an electric impulse emitter. The number of impulses per unit of time during which the measurement is made is a measure of the velocity at the point under consideration.

When a current meter is lowered along a vertical from the surface of the water to the bed of the stream at a uniform speed, the number of revolutions of the meter during said lowering movement is a measure of the mean velocity of flow along that vertical. If the meter is lowered along a number of "verticals" at regular intervals across the stream, then the total number of revolutions made by the meter multiplied by the distance between adjacent verticals is a measure of the discharge of the stream.

A rotary current meter cannot be lowered right to the bed of the stream. Its descent has to be stopped at a certain height above the bed depending upon the dimensions of the meter and the discharge figures given by it are therefore too low.

Briefly stated, the apparatus in accordance with the invention comprises means for measuring the number of revolutions made by the meter during a predetermined time interval during which the meter remains at the level at which its descent is stopped. Making an assumption as to the law governing the rate at which the velocity drops at points beneath said level, the number of revolutions of the meter made at that level during a time interval determined in accordance with that assumption is a measure of the velocity of flow beneath that level.

The invention will now be explained in greater detail with reference to the accompanying drawings, in which:

Figure 1 is part of a velocity diagram illustrating the idea underlying the invention.

Figure 2 is a circuit arrangement of the essential parts of the apparatus according to the invention.

Figure 5 is a typical velocity diagram which is recorded by means of the recording device.

Fig. 6 is a circuit arrangement of the essential parts of a modified apparatus according to the invention.

When a current meter is lowered at uniform speed along a vertical the number of revolutions it makes while being lowered through a given distance gives an indication of the mean velocity of the stream between the starting and finishing levels. If periodical readings are taken, a velocity diagram such as is shown in Figure 1 can be obtained in which V is the vertical and $cC$, $dD$ and so on represent the velocities at the levels $c$, $d$ and so on above the base B of the stream. In order that the rotation of the meter shall not be impeded by coming into contact with the bed of the stream, the meter is not lowered beyond the level $e$ which will be referred to hereinafter as the terminal level. The velocity at the terminal level is represented by the line $eE$. It can be assumed that the rate of change of velocity from the terminal level $e$ to the bed B can be represented with sufficient accuracy by the parabolic arc EB. The area of the figure $eEB$ is equal to that of the rectangle $eEFB'$, the short side $eB'$ of which is equal to $\frac{2}{3}$ of $eB$.

It will be assumed that the meter is lowered at the rate of 1 cm./sec. and that a velocity recording is made every 10 seconds by apparatus controlled by current impulses emitted in accordance with the rotation of the meter. The vertical distances $cd$, $de$ in the velocity diagram (Figure 1) thus represent both the time which elapses during successive recordings (10 seconds) and also the distance between the levels at which recordings are made (10 cms.). If the terminal level $e$ is 15 cms. above the bed B and the meter is kept at that level for 10 seconds (i. e. ⅔ of 15), a velocity B'F will be recorded and, clearly, the area $cCFB'$ will be the same as the area $cCB$.

Figure 3:
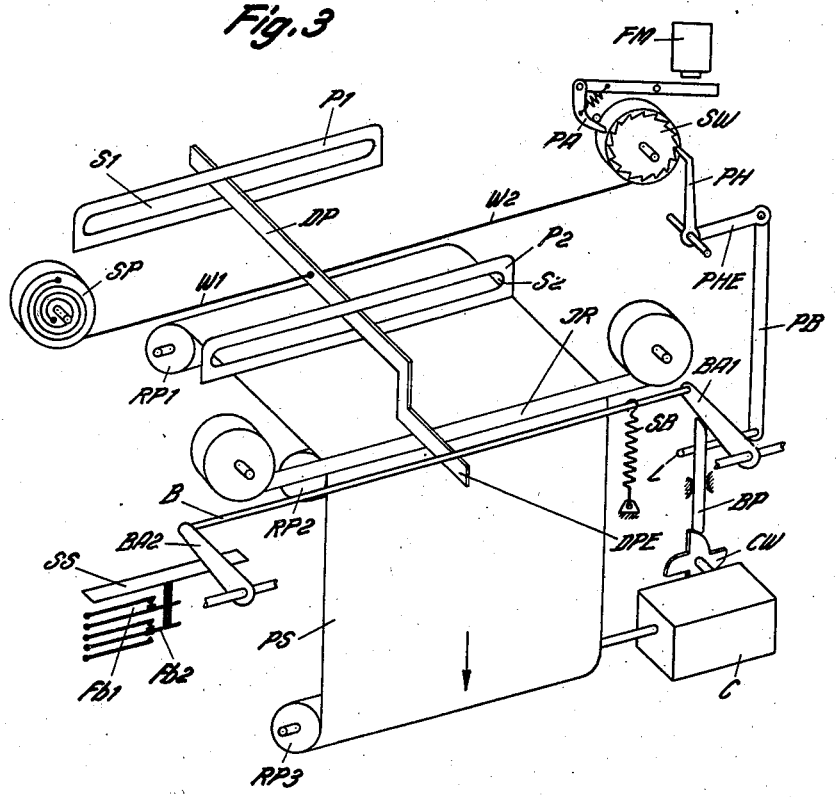
Figure 3 is a perspective view illustrating a recording device of the apparatus according to the invention.

The apparatus shown diagrammatically in Figures 2 and 3 comprises a hydrometric current meter F which controls a current impulse contact FK. The meter F is suspended from a winch W which can lower the meter at a uniform speed of 1 cm./sec. A feeler GT is connected to the meter F; the feeler closes a contact when it touches the bed of the stream. The meter is then 15 cm. above the bed.

The contact FK which is actuated by the current meter F lies in the circuit of a relay $Imp$ which transmits the impulses by its contact $imp$ to an electromagnetic counting mechanism Z of the step-by-step type. The counter Z totals the impulses transmitted by the contact $imp$.

The recording device shown in Figure 3 comprises a dot printing bar DP which is guided in slots S1 and S2 in suitably arranged plates P1, P2. The pointer DP is connected by a wire W1 to a spring SP which tends to move the pointer towards its left hand or zero position. A further wire W2 connects the pointer DP to a stepping wheel SW which can be moved step-by-step by a pawl PA mounted on the armature of a driving magnet FM. A holding pawl PH prevents the movement of the wheel SW and of the bar DP under the action of the spring SP. A paper strip PS is guided by rollers RP1, RP2, RP3 of which the roller RP3 is continuously driven by a clockwork C. Between the printing end DPE of the bar DP and the paper strip PS lies an inking ribbon JR which causes a dot to be printed when the bar DP is depressed. Above the printing end DPE of the bar DP lies a chopper bar B carried by cranks BA1 and BA2. The crank BA1 is normally held in the position shown by a rod BP which is controlled by a cam CW. The latter is connected to the clockwork C and is intermittently turned through 90° by the clockwork C so as to allow the chopper bar B to be brought down by its spring SB and to be immediately raised again. During its downward movement, the crank BA1 strikes a lug L on a bar PB connected to the tail PHE of the holding pawl PH so that this pawl is kept out of engagement with the stepping wheel SW and the dot printing bar DP is pulled to the left by its spring SP. The crank BA2 during its downward movement strikes a spring SS which controls the contacts $fb1$ and $fb2$.

Figure 4:
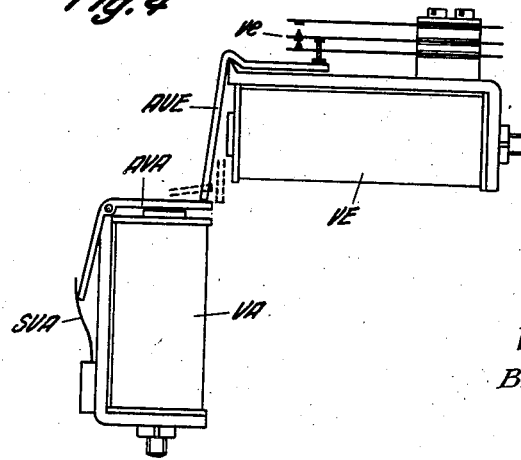
Figure 4 is a schematic view of a pair of relays used in the circuit arrangement shown in Figure 2.

The apparatus comprises also a number of pairs of relays GE, GA; RE, RA and VE, VA which control locking means for each other. Figure 4 shows the construction of the pair of relays VE, VA. The other pairs of relays are similarly constructed. The relays VE and VA are so arranged that the armature AVE of the relay VE when released locks the armature AVA of the relay VA in its attracted position and viceversa. If, for example, the relay VE is momentarily energised and attracts its armature AVE, the contact $ve$ is actuated and the armature AVA is released. When the armature AVA takes up its normal position under the action of the spring SVA, it lies to one side of the armature AVE (as shown dotted in Figure 4) and locks the armature AVE in its attracted position, so that the contact $ve$ remains actuated even after the interruption of the energisation circuit of the relay VE. If then the relay VA is momentarily energised, its armature AVA unlocks the armature AVE of the relay VE and is itself locked in the attracted position shown in full lines. The pairs of relays RE, RA and GE, GA coact similarly. Thus, one of the armatures of each pair of relays is always in the attracted position.

The general operation of the device is as follows:

Before measuring is begun, the meter F is lowered to the surface of the water. The clockwork C turns the cam CW through 90° during each 10th second. At the beginning of its movement, the cam CW releases the chopper bar B and the crank BA2 actuates the contacts $fb1$ and $fb2$. The contact $fb2$ closes the circuit for a lamp SL (Figure 2) which remains illuminated until, at the end of the 10th second, the chopper bar B is again raised by the cam CW. When the lamp SL lights up, the key T must be actuated by an operator. This key closes a circuit for the relays GA and VA and controls means (not shown) for starting the winch W so as to lower the meter F at a uniform speed of 1 cm./sec. On energisation of the relay GA, the armature of the relay GE is unlocked and returns into the normal position in which the contacts $ge1$, $ge2$, $ge3$, $ge4$ are in the positions shown in the drawing. Similarly, on energisation of the relay VA, the armature of the relay VE is unlocked and returns into the rest position in which the contact $ve$ is in the position shown in the drawing. A circuit for relay $Imp$ is now closed at the contact $ge1$ and this relay is periodically energised under the influence of the meter contact FK. At each energisation, the contact $imp$ is closed and a current impulse is transmitted to the magnet FM which displaces the dot printing bar DP and to the magnet Z which actuates a current impulse counting mechanism. At the beginning of the tenth second, the chopper bar B is released by the cam CW and opens the contact $fb1$ in the circuit of the magnet FM. The current impulses which are received during the tenth second thus step the counting mechanism Z but not the dot printer DP. The position of the dot printer DP is recorded on the paper strip PS by means of the chopper bar B and the dot printer DP is then mechanically restored into its rest position under the action of the spring SP. At the end of the tenth second, the chopper bar B again rises and closes the contact $fb1$. This procedure is repeated periodically during the descent of the meter F and a series of points A to J is recorded as shown in Figure 5. The vertical distances between these points A to J represent descents of the meter of 10 cm., the recordings having been made every ten seconds and the meter being lowered at the rate of 1 cm. per second.

When the feeler GT touches the bed of the stream, a circuit for the relay GE is closed, the relay GE is energised and its armature is locked in the attracted position. Contact $ge1$ is thus opened and the circuit for the relay $Imp$ is opened. Any further current impulses emitted by the contact FK of the meter are thus ineffective to move the dot printer DP and the counting mechanism. In closing, the contact $ge4$ switches in a lamp GL1 which indicates that the feeler GT has grounded and also closes a circuit for a bell GW arranged near the winch W. The operator of the winch operates a handle such as WH in Fig. 6 and stops thereby the descent of the meter. A signal lamp GL2 may be switched in instead of the bell GW by means of a hand switch U. The dot printer thus remains in the position in which it happened to be when the feeler GT grounded.

At the beginning of the tenth second after the last recording, the chopper bar is again released by the cam wheel CW of the clockwork C, so that the point K (Figure 5) is recorded. The vertical distance ik between this point K and the previously recorded point J does not indicate the distance through which the meter has been lowered since the point J was recorded, because the descent of the meter has been stopped, for example, in the position il. However, the area of the rectangle having a base Kk and a height ik is equal to that of the rectangle having a base il, Il and a height iil. The point Jl which indicates the velocity at the terminal level il, i. e. at the level at which the feeler grounds, is, however, not recorded.

When the chopper bar B is actuated to record the point K, the contact fb2 closes a circuit for the relay RE which has already been prepared by the contact ge2. The relay RE attracts its armature which is locked in the manner already described. The contact re1 therefore again closes a circuit for the relay Imp, so that the current impulses emitted by the meter contact FK are again received by relay Imp and transmitted to the counter Z. When the chopper bar B is again lifted and the contact fb1 closed, these current impulses are transmitted to the magnet FM, so that the dot printer DP is moved forward. At the same time, the contact fb2 closes a circuit for the relay VE and for a lamp RL which indicates that the supplementary measurement is being made at the terminal level. The relay VE attracts its armature, which locks itself and throws its contact ve so as to prepare a circuit for the relay RA. The current impulses given by the meter contact FK are now received by the recording device for 9 seconds. At the beginning of the tenth second, the chopper bar is again released and the point L (Figure 5) is recorded. The contact fb2 thus closes the circuit for relay RA which releases the armature of the relay RE. The contact re1 is thus opened and the circuit for the relay Imp is now definitely interrupted. The contact re2 opens the circuit for the lamp RL so that the latter cannot be switched in again. The recording and counting is thus terminated. The meter F must then be drawn up again by the winch W and the whole procedure must be repeated when the meter has been moved over the next vertical.

The length of the line lL (Figure 5) indicates the velocity at the terminal level. The distance kl corresponds mathematically to a distance of 10 cm., i. e. ⅔ of the height of the terminal level above the bed of the stream. A rectangle having a base lL and a height lk is therefore equal in area to the figure bounded by a parabolic arc similar to the arc EB in Figure 1 and the lines Jl, il. This area would thus be included in the total area indicated by passing a planimeter round the points A—J, K, L, l—a, which total area indicates the discharge. As the points A—L are plotted after movement of the dot printer for 9 seconds in every 10, the velocity diagram must be considered to be plotted to a scale of $\frac{9}{10}$. This can easily be allowed for in computing the final result.

The counting mechanism Z has counted all the current impulses which are recorded during the lowering of the meter F from the surface until the feeler GT grounds. Thereafter, impulses were transmitted to the counting mechanism Z during a further 10 seconds. These current impulses give an indication of the discharge below the terminal level. If the measurement is repeated along exactly equidistant verticals over the whole cross-section, the product of the distance between adjacent verticals, the total number of current impulses counted and a conversion factor, gives the actual discharge directly.

If the recording of the velocities at different levels and the plotting of a velocity diagram are not required and it is only the number of current impulses which are transmitted by the meter which is to be recorded, the electrical arrangement may be considerably simplified. Such an arrangement is shown in Figure 6. The meter F is suspended from a winch W which can lower it at a uniform speed. The meter controls a current impulse contact FK connected to the counting magnet Z. The feeler GT connected to the meter F closes a circuit for relay G when it touches the bed of the stream. The actuation of the relay G is delayed by means of a condenser C arranged parallel to its winding. Thus when the feeler GT closes the circuit relay G attracts its armature only after a period of ten seconds. In attracting its armature relay G opens contact g which interrupts the circuit of the counting magnet Z. A lamp GL is arranged in the circuit of relay G. This lamp lights up when the feeler touches the bed of the stream. The operator of the winch W sees that the feeler has grounded and actuates the handle WH by means of which the lowering movement of the winch is stopped. After ten seconds the operator winds up the meter F. At the begin of a new measurement the key T must be operated. Then relay G releases and contact g connects again the impulse emitting contact FK of the meter F to the counting magnet Z.

The sum of the current impulses indicated by the counting mechanism during a number of sinkings gives a direct indication of the total discharge.

If Q is the total discharge in cubic meters per second over the cross-section under consideration, and $n1, n2 \ldots$ are the numbers of revolutions made by the current meter while being lowered along the various verticals, $T1, T2 \ldots$ the depths of the stream in centimeters, $t1, t2 \ldots$ the time in seconds during which the meter is lowered, and $b1, b2 \ldots$ the distances between the verticals in meters, then $$Q = n1 \cdot \frac{T1}{t1} \cdot b1 + n2 \cdot \frac{T2}{t2} \cdot b2 + \ldots$$

If the meter is lowered at an absolutely constant speed of 1 cm./sec., the factors $$\frac{T1}{t1}, \frac{T2}{t2}$$

are equal to 1, so that they may be ignored. Furthermore, if the distances $b1, b2$ between the various verticals are made all alike, we obtain the formula:

$$Q = b(n1 + n2 + \ldots) \text{ or}$$

$$Q = b \cdot N$$

where N=the sum total of all the revolutions made by the current meter while being lowered along all the verticals, which sum is indicated by the counting mechanism.

I claim:

1. Apparatus for measuring the discharge of a stream comprising a current meter, a feeler connected to said current meter, means for lowering said meter at a uniform speed from the surface of the water to the bed of the stream, means controlled by said meter for emitting current impulses, mechanism controlled by said current impulses for counting the revolutions made by said meter, means controlled by said feeler for indicating that said feeler has reached the bed of the stream, means controlled by said feeler for disconnecting said counting mechanism from the current impulse emitting means, a time switch device, means controlled by said disconnecting means for reconnecting said counting mechanism to said current impulse emitting means for a predetermined interval of time and means controlled by said time switch device for making ineffective said reconnecting means after said predetermined interval of time.

2. Apparatus for measuring the discharge of a stream comprising a current meter, a feeler connected to said meter, a current impulse emitter controlled by said meter, means for lowering said meter and said feeler from the surface to the bed of said stream at a uniform speed, an impulse relay controlled by said current impulse emitter, a feeler relay controlled by said feeler, a registering device, a detent controlling said registering device, a time switch device for periodically controlling said detent, a stepping device controlled by said impulse relay for controlling said registering device, means controlled by said feeler relay for disconnecting said impulse relay from said impulse emitter, a relay for reclosing a connection between said impulse relay and said impulse emitter, means controlled by said feeler relay for preparing a circuit for said reclosing relay, means controlled by said time switch device for closing said circuit of said reclosing relay and means controlled by said time switch device for opening said reclosing relay.

3. Apparatus according to claim 2, comprising also mechanical means for holding the armatures of said feeler relay and said reclosing relay in their attracted positions and auxiliary coils associated with each relay for making said mechanical means ineffective.

4. A device for measuring the discharge of a stream comprising a current meter, a feeler connected to said current meter, a current impulse emitter controlled by said meter, means for lowering said meter and said feeler from the surface to the bed of the stream at a uniform speed, means for counting the revolutions made by said meter during its downward movement connected to said impulse emitter, a registering device, a detent controlling said registering device, a time switch device for periodically actuating said detent, stepping means connected to said current impulse emitter for setting said registering device, means controlled by said time switch device during each control of said registering device for disconnecting said stepping means from said impulse emitter, means controlled by said feeler for indicating that the feeler has grounded, means for interrupting the downward movement of said meter, means controlled by said feeler for disconnecting said stepping means from said current impulse emitter and for disconnecting said counting means from said current impulse emitter, means controlled by said time switch device for reclosing a connection between said current impulse emitter and said counting means and said stepping means and means controlled by said time switch device on a further actuation for final disconnection of said current impulse emitter from said counting means and from said stepping means.

5. In a device for measuring the discharge of a stream the combination of a meter, a feeler connected to said meter, means for lowering said meter and said feeler at a uniform speed from the surface of the water to the bed of the stream, means controlled by said meter for emitting current impulses, a counting mechanism controlled by said current impulses, means controlled by said feeler for disconnecting said counting mechanism from said impulse emitting means, and a device for delaying said disconnection of said counting mechanism from said impulse emitting means.

6. In a device for measuring the discharge of a stream, the combination of a meter, a feeler connected to said meter, means for lowering said meter and said feeler at a uniform speed from the surface of the water to the bed of the stream, means controlled by said meter for emitting current impulses, a counting mechanism controlled by said current impulses, means controlled by said feeler for disconnecting said counting mechanism from said impulse emitting means, a time switch, means controlled by said feeler for switching in said time switch, and means controlled by said time switch and effective only while said feeler touches the bed of the stream for connecting said counting mechanism to said impulse emitting means for a predetermined interval of time.

7. In a device for measuring the discharge of a stream, the combination of a meter, a feeler connected to said meter, means for lowering said meter and said feeler along a vertical from the surface of the water to the bed of the stream, means controlled by said feeler for indicating that said feeler has reached the bed of the stream, means for interrupting the downward movement of said meter and said feeler, current impulse emitting means controlled by said meter, a counting mechanism controlled by said current impulses and connected to said current impulse emitting means by an impulse circuit, means controlled by said feeler for opening said impulse circuit, a time switch including contacts controlled at predetermined intervals of time and means controlled by said feeler for making said contacts effective to close said impulse circuit during a predetermined interval of time.

8. In a device for measuring the discharge of a stream, the combination of a meter, a feeler connected to said meter, means for lowering said meter and said feeler along a vertical from the surface of the water to the bed of the stream, means controlled by said feeler for indicating that said feeler has reached the bed of the stream, means for stopping the downward movement of said meter and said feeler, current impulse emitting means controlled by said meter, a dot-printer, a stepping magnet for moving said dot-printer, a clockwork, means actuated intermittently by said clockwork for actuating said dot-printer so as to print a dot in the position in which it happens to be at the moment of actuation, means actuated intermittently by said clockwork for releasing said dot-printer, an impulse circuit connecting said impulse emitting means to said magnet, means controlled by said clockwork for opening said impulse circuit during actuation and the release of said dot-printer, means controlled by said feeler for opening said impulse circuit, and means actuated by said clockwork for reclosing said impulse circuit for a period determined by said clockwork, said means being effective after the actuation of the dot-printer following the actuation of said feeler.

9. In a device for measuring the discharge of a stream, the combination of a meter, a feeler connected to said meter, means for lowering said meter and said feeler at a uniform speed along a vertical from the surface of the water to the bed of the stream, means controlled by said feeler for indicating that said feeler has reached the bed of the stream, means for stopping the downward movement of said meter and said feeler, current impulse emitting means controlled by said meter, a counter controlled by impulses and connected to said impulse emitting means, a movable dot-printer, an impulse-responsive stepping magnet for moving said dot-printer and connected to said impulse emitting means, a clockwork, means actuated intermittently by said clockwork for actuating said dot-printer so as to print a dot in the position in which it happens to be at the moment of actuation, means actuated intermittently by said clockwork for releasing said dot-printer, means actuated intermittently by said clockwork for disconnecting said magnet from said impulse emitting means during each actuation and each release of said dot-printer, means controlled by said feeler for disconnecting said counter and said magnet from said impulse emitting means and means controlled by said clockwork for a period determined by said clockwork for reconnecting said counter and said magnet to said impulse emitting means, said means being effective after the release of said dot-printer which follows the actuation of said feeler.

10. In a device for measuring the mean velocity of flow of a stream, the combination of a hydrometric current meter, a feeler connected to said meter, means for lowering said meter along a vertical from the surface of the water to the bed of the stream at a uniform speed, means for counting the number of revolutions made by said meter during its lowering movement, means for holding said meter at a terminal level slightly above the bed of the stream when said feeler touches the bed of the stream, a time switch device, means controlled by said feeler for making effective said time switch device, and means controlled by said time switch device for counting the number of revolutions of said meter made at said terminal level during a predetermined time interval while the feeler touches the bed of the stream.

WALTER TURK.